United States Patent Office 2,833,832
Patented May 6, 1958

2,833,832

OXIDATIVE DEHYDROGENATION OF CYCLOHEXANE

John E. Fox, Texas City, Tex., assignor to Monsanto Chemical Company, St. Louis, Mo., a corporation of Delaware No Drawing. Application March 26, 1954
Serial No. 419,169

7 Claims. (Cl. 260—668)

The present invention relates to the dehydrogenation of naphthene hydrocarbons and, more particularly, to the oxidative dehydrogenation of cyclohexane to produce benzene.

It is well known that naphthenic hydrocarbons having six-membered rings (that is, cyclohexane and its homologues) may be easily converted by dehydrogenation to benzene and the corresponding alkylbenzenes. In converting cyclohexane to benzene any one of a large number of dehydrogenation catalysts can be used. Of the many known common ones available may be mentioned oxides such as chromium oxide, vanadium oxide, titanium oxide and iron oxide; metals such as platinum, nickel, palladium and copper; any of a number of metallic sulfides; and any mixtures or combinations of these materials. Considerable work has been done on treating naphthenic hydrocarbons for the formation of aromatic hydrocarbons in the presence of catalysts comprising essentially mixtures of alumina with an oxide of chromium and these materials have been proven to have outstanding value with respect to catalytic activity in promoting the desired reaction. However, all of these processes require high conversion temperatures and most of the suitable catalysts are not desirably resistant to the required temperatures. In addition, the catalysts gradually lose their effectiveness not only by reason of a reduction of active catalytic surface brought about by gradual deposition thereon of carbonaceous materials produced in secondary reactions, but also because they undergo gradual crystallization to less active forms. Consequently, this method for converting cyclohexane to benzene has some shortcomings and disadvantages.

There have been some attempts in the prior art also to oxidatively dehydrogenate cyclic hydrocarbons such as decalin, terralin and cyclohexane. In general, however, such work has resulted in the production of a predominating yield of oxygenated products and the desired corresponding unsaturated hydrocarbon has been obtained in only very low yields. An excellent review of this art is presented in the oxidative dehydrogenation of cyclohexane to cyclohexene and of cyclohexene to benzene over silica gel alone or over tellurium oxide on silica gel catalysts is described in U. S. Patent 2,661,380, issued to Orkin.

It has now been discovered that cyclohexane can be oxidatively dehydrogenated directly to benzene at only moderately high temperatures by employing a catalyst comprising copper chloride, ferric chloride, and cobalt chloride deposited on alumina. According to the process of the present invention, the oxidative dehydrogenation of cyclohexane is effected by passing preheated cyclohexane and an oxidizing gas containing free oxygen through a reactor in contact with a catalyst comprising copper chloride, ferric chloride and cobalt chloride deposited on alumina maintained at a temperature from 250 to 400° C. and separating the benzene produced from the reaction product by distillation techniques.

The following examples are presented to illustrate the invention but are not intended to limit its scope in any manner.

Example I

A preheater-reactor constructed of 1-inch diameter glass tubing encased in a jacket of 2-inch glass pipe over all of its six-foot length was employed in the experiment. A heat-transfer agent, such as that known to the trade as "Aroclor" for example, was heated to the desired temperature and continuously circulated through the jacket. The lower 27 inches of the tube was packed with catalyst while the rest of the tube was packed with glass helices. The catalyst was prepared by impregnating 4–8 mesh alumina with a solution of salts in the following approximate proportions by weight:

| | Percent |
|---|---|
| $CuCl_2 \cdot 2H_2O$ | 79.5 |
| $CoCl_2 \cdot 6H_2O$ | 15.8 |
| $FeCl_3 \cdot 6H_2O$ | 4.7 |

The deposited salts after drying represented about 18% of the total weight of the catalyst.

Cyclohexane and water were fed into the top section of the reactor where they were preheated to the temperature of the circulating heat transfer medium maintained at about 283° C. and thence through the catalyst bed. Feed rates at standard conditions were as follows:

Cyclohexane—1.7 ml./min. liquid=352 ml./min. gas
Water—3.0 ml. min.=3730 ml./min. gas Reaction product leaving the bottom of the reactor was condensed by means of cold traps. The organic layer was washed with water, dried, and fractionally distilled. The temperature rose immediately to 80.5° C. and the liquid was allowed to reflux for 45 minutes before any distillate was collected at this temperature. The refractive index of the distillate was determined to be $n_D^{25}$ 1.423, indicating that the product was pure cyclohexane.

Example II

The experiment of Example I was duplicated in every detail except that the run was conducted at a bath temperature of 318° C. Fractionation of the product collected over a period of several hours operation and analysis by refractive index again revealed that it contained only cyclohexane.

Example III

The experiment of Example I was again repeated with the temperature of the heating medium maintained at approximately 285° C. except that in this experiment 1840 ml. of air per minute were fed with the other reactants. The run was of 1.5 hours' duration and 47.1 g. of organic product was collected after the crude product was washed with water and dried. This was subjected to fractionation and a benzene-cyclohexane azeotrope boiling in the range from 76–77° C. was obtained as the first cut. The refactive index of this cut was determined and from this value the amount of benzene in the azeotrope was calculated. Approximately 11.9 g. of the product or 25.3 wt. percent of the product was benzene. This represents a conversion of 27.7%. The residue was shown by infrared analysis to be substantially cyclohexane with only traces of benzene present.

It is to be noted that when cyclohexane and air were passed over the catalyst in the above examples dehydrogenation to benzene occurred, but, when cyclohexane alone was passed over the same catalyst, no benzene at all was produced. The reaction of the invention is, therefore, essentially an oxidation since no conversion was obtained in the absence of air.

Some variations from the procedure given in the examples may be made without departing from the scope of the invention. Pure oxygen may be substituted, for example, for the air used. The reaction may be conducted at any temperature within the range of from about 250° C. to about 400° C., but the preferred temperature range is from about 275° C. to about 325° C.

Molecular equivalents of the reactants as represented by the following equation may be employed:

$$C_6H_{12} + 1.5 O_2 \rightarrow C_6H_6 + 3H_2O$$

However, an excess of oxygen or air in the range from 10% to 200% is desirable to secure optimum yields. Expressed in another fashion, the molecular ratio of cyclohexane to oxygen may vary within the range from 1:1.5 to 1:5 but preferably molecular ratios of 1:1.5 to 1:2 are employed. In the introduction of the feed gases, precautions should be taken to avoid mixtures coming within the explosive range. Since the reaction is a highly exothermic one, a helpful expedient in controlling reaction temperature and in regulating the hot spot formed in the catalyst bed is the use of an inert diluent such as steam or water vapor fed with the reactants. Any inert gas, that is, one which is not affected under the reaction conditions, which has a good heat capacity may be used for this purpose. The diluting effect of the inert gas also makes it easier to avoid explosive limits of the hydrocarbon and air mixture.

The process of the reaction is ordinarily conducted at atmospheric pressure, but may be carried out as well at superatmospheric or at subatmospheric pressures.

The alumina-impregnated catalyst employed in the reaction may be readily prepared by boiling the carrier in a saturated solution of the salts. Gases held in the pores of the solid are driven out almost as efficiently as if they had been exhausted at low pressures. When the hot excess liquid is drained from the carrier, the solution is found to be uniformly distributed throughout all the particles of the mass. Specific directions for preparing the catalyst are as follows:

Approximately 114.0 parts by weight of copper chloride ($CuCl_2 \cdot 2H_2O$), and 22.7 parts by weight of cobalt chloride ($CoCl_2 \cdot 6H_2O$), and 6.8 parts by weight of iron chloride ($FeCl_3 \cdot 6H_2O$) are dissolved in 182.0 parts by weight of water and the mixture is brought to a boil. The salts used are analytical reagent grade. To the boiling solution is added 400 parts by weight of activated alumina (4–8 mesh), after which the mixture is allowed to boil slowly for a period of from 30 to 60 minutes. The excess liquor is then drained off and the catalyst is dried in an oven at 110° C. with occasional stirring.

Side reactions such as cracking and condensation to polynuclear hydrocarbons, etc., if they occur, take place to only a negligible extent. The reaction product, therefore, consists essentially of benzene and cyclohexane and after separation the latter may be readily recycled to the process. Since benzene and cyclohexane boil at approximately the same temperature and also form an azeotrope with each other which boils at approximately 76–77° C., separation cannot be effected by a simple fractional distillation. However, by recourse to azeotropic distillation employing any of several suitable entraining agents, the two compounds may be readily separated. Suitable processes for such separation are described, for example, in U. S. Patents 2,212,810, 2,302,608, and 2,561,624.

What is claimed is:

1. A process for the production of benzene by oxidative dehydrogenation of cyclohexane which comprises bringing a mixture of cyclohexane and a gas containing free oxygen in contact with a catalyst comprising copper chloride, cobalt chloride, and ferric chloride deposited on alumina at temperatures in the range from about 250° C. to about 400° C. and separating benzene.

2. A process for the production of benzene by oxidative dehydrogenation of cyclohexane which comprises bringing a mixture of cyclohexane and a gas containing free oxygen in contact with a catalyst comprising copper chloride, cobalt chloride, and ferric chloride deposited on alumina at temperatures in the range from about 275° C. to about 325° C. and separating benzene.

3. A process for the production of benzene by the oxidative dehydrogenation of cyclohexane which comprises bringing a mixture of cyclohexane and a gas containing free oxygen such that the molecular ratio of cyclohexane to oxygen in said mixture is in the range from 1:1.5 to 1:5 in contact with a catalyst comprising copper chloride, cobalt chloride and ferric chloride deposited on alumina at temperatures from about 250° C. to about 400° C. and separating benzene.

4. A process for the production of benzene by oxidative dehydrogenation of cyclohexane which comprises bringing a mixture of cyclohexane and a gas containing free oxygen such that the molecular ratio of cyclohexane to oxygen in said mixture is in the range from 1:1.5 to 1:2 in contact with a catalyst comprising copper chloride, cobalt chloride and ferric chloride deposited on alumina at temperatures from about 275° C. to about 325° C.

5. A process for the production of benzene by the oxidative dehydrogenation of cyclohexane which comprises mixing cyclohexane and a gas containing free oxygen in such proportions that the molecular ratio of cyclohexane to oxygen is in the range from 1:1.5 to 1:5 with a diluent and contacting said mixture with a catalyst comprising copper chloride, cobalt chloride, and ferric chloride deposited on alumina at temperatures from about 250° C. to about 400° C.

6. A process for the production of benzene by the oxidative dehydrogenation of cyclohexane which comprises mixing cyclohexane and a gas containing free oxygen in such proportion that the molecular ratio of cyclohexane to oxygen is in the range from 1:1.5 to 1:2 with water vapor and contacting said mixture with a catalyst comprising copper chloride, cobalt chloride, and ferric chloride deposited on alumina at temperatures from about 275° C. to about 325° C.

7. A process for the production of benzene by the oxidative dehydrogenation of cyclohexane which comprises mixing cyclohexane and a gas containing free oxygen in such proportion that the molecular ratio of cyclohexane to oxygen is in the range from 1:1.5 to 1:2 with an inert gas and contacting said mixture with a catalyst comprising copper chloride, cobalt chloride, and ferric chloride deposited on alumina at temperatures from about 275° C. to about 325° C.

References Cited in the file of this patent

UNITED STATES PATENTS

| | | |
|---|---|---|
| 1,257,906 | Mann et al. | Feb. 26, 1918 |
| 2,351,793 | Voorhies | June 20, 1944 |
| 2,661,380 | Orkin | Dec. 1, 1953 |

FOREIGN PATENTS

| | | |
|---|---|---|
| 748,442 | France | Apr. 18, 1933 |

OTHER REFERENCES

Milas: "Journal of American Chemical Soc.," vol. 61 (1939), pp. 633–635.

UNITED STATES PATENT OFFICE
CERTIFICATE OF CORRECTION

Patent No. 2,833,832  May 6, 1958

John E. Fox

It is hereby certified that error appears in the printed specification of the above numbered patent requiring correction and that the said Letters Patent should read as corrected below.

Column 1, line 50, for "terralin" read — tetralin —; line 54, for "presented in" read — presented and —; column 2, line 28, for "3.0 ml. min." read — 3.0 ml./min. —; line 58, for "refactive" read — refractive —.

Signed and sealed this 23rd day of September 1958.

(SEAL)
Attest:

KARL H. AXLINE
Attesting Officer

ROBERT C. WATSON
Commissioner of Patents